US006193248B1

(12) United States Patent
Liu

(10) Patent No.: US 6,193,248 B1
(45) Date of Patent: Feb. 27, 2001

(54) DETACHABLE COUPLING BLOCK AND BASE FRAME MOUNTING ARRANGEMENT FOR KICK SCOOTER

(76) Inventor: Ssu-Liu Liu, 2F., No. 44, Lane 11, Fu Hsin North Rd., Taipei (TW)

( * ) Notice: Subject to any disclaimer, the term of this patent is extended or adjusted under 35 U.S.C. 154(b) by 0 days.

(21) Appl. No.: 09/634,575

(22) Filed: Aug. 8, 2000

(30) Foreign Application Priority Data

Mar. 2, 2000 (TW) ........................................... 89203310

(51) Int. Cl.[7] ................................................ A61G 7/10
(52) U.S. Cl. ................................ 280/87.041; 280/87.05
(58) Field of Search ........................... 280/87.041, 87.05, 280/639, 641, 63, 200, 263, 270

(56) References Cited

U.S. PATENT DOCUMENTS 5,419,572 * 5/1995 Ballotte ........................... 280/87.041
5,846,660 * 12/1998 McGreen .......................... 280/87.05
6,120,044 * 9/2000 Tsai .................................. 280/87.05

FOREIGN PATENT DOCUMENTS

596064 * 10/1925 (FR) .................................. 280/87.05
264987 * 2/1927 (GB) .................................. 280/87.05

* cited by examiner

*Primary Examiner*—Richard M. Camby
(74) *Attorney, Agent, or Firm*—Varndell & Varndell, PLLC

(57) ABSTRACT

A detachable coupling block and base frame mounting arrangement includes a base frame adapted to hold a rear wheel, a coupling block mounted on the base frame at a front side and adapted to receive a connecting frame of a head frame unit for kick scooter, a sliding locking block slidably mounted in a longitudinal sliding groove at a bottom side of the base frame and adapted to lock the coupling block, wherein the coupling block has a front bottom hook inserted into a front notch on the base frame and a rear bottom hook inserted into an insertion hole on the base frame, and the sliding locking block has a front notch and a coupling hole adapted to receive the front bottom hook and rear bottom hook of the coupling block, enabling the coupling block to be locked upon a forward movement of the sliding coupling block in longitudinal sliding groove after insertion of the front bottom hook and rear bottom hook of the coupling block into the front notch and coupling hole of said sliding locking block.

1 Claim, 7 Drawing Sheets

72 71 7 10 1 102 8021 802 101 8011 801 742 73 732 81 70 741 74 731 8

DETACHABLE COUPLING BLOCK AND BASE FRAME MOUNTING ARRANGEMENT FOR KICK SCOOTER

BACKGROUND AND SUMMARY OF THE INVENTION

The present invention relates to kick scooters, and more specifically to a detachable coupling block and base frame mounting arrangement, which enables a coupling block to be detachably fastened to a base frame for kick scooter to receive a head frame unit for kick scooter.

A regular kick scooter, as shown in FIG. 1, comprises generally a base frame 91, a head frame unit 92, a front wheel 93, a rear wheel 94, and a connecting frame 96. The head frame unit 92 is supported on the front wheel 93, and holds a handlebar 921 for steering control. The connecting frame 96 has a front end welded to the head frame unit 92, and a forked rear end 961 coupled to a coupling block 97 at the front side of the base frame 91 by a pivot 960. The rear wheel 94 is mounted on the rear side of the base frame 91. The coupling block 97 is welded to the front side of the base frame 91 at the top. The head frame unit 92 can be turned with the connecting frame 96 relative to the coupling frame 97 and the base frame 91 between the operative position and the non-operative position. Further, lock means (not shown) is controlled to lock the head frame unit 92 in the operative or non-operative position. This structure of kick scooter has drawbacks. Because the coupling block 97 is welded to the front side of the base frame 91 at the top, much toxic gas is produced when welding the coupling block 97 to the base frame 91. Because the coupling block 97 is welded to the front side of the base frame 91 at the top, it is difficult to control the quality of the kick scooter. Further, because the coupling block 97 is welded to the front side of the base frame 91, the coupling block 97 is not detachable, and the finished kick scooter requires much storage space and packing material during its delivery from the factory or warehouse to the distributor.

The present invention has been accomplished to provide a detachable coupling block and base frame mounting arrangement, which eliminates the aforesaid problem. According to the present invention, the detachable coupling block and base frame mounting arrangement comprises a base frame adapted to hold a rear wheel a coupling block detachably mounted on a front side of the base frame and adapted to receive a connecting frame of a head frame unit for kick scooter, enabling the head frame unit to be pivoted to the base frame and turned with the connecting frame between the operative position and the non-operative position, and a sliding locking block slidably inserted into a longitudinal sliding groove in the base frame to lock the coupling block. Because no welding process is used, no toxic gas is produced during the assembly of the detachable coupling block and base frame mounting arrangement. Furthermore, because the coupling block is detachably mounted on the base frame and then locked by the sliding locking block, the sliding locking block, the coupling block and the base frame can be detached from one another to minimize delivery or storage space, and to reduce the consumption of packing material.

DETAILED DESCRIPTION OF THE PREFERRED EMBODIMENT

Figure 1:
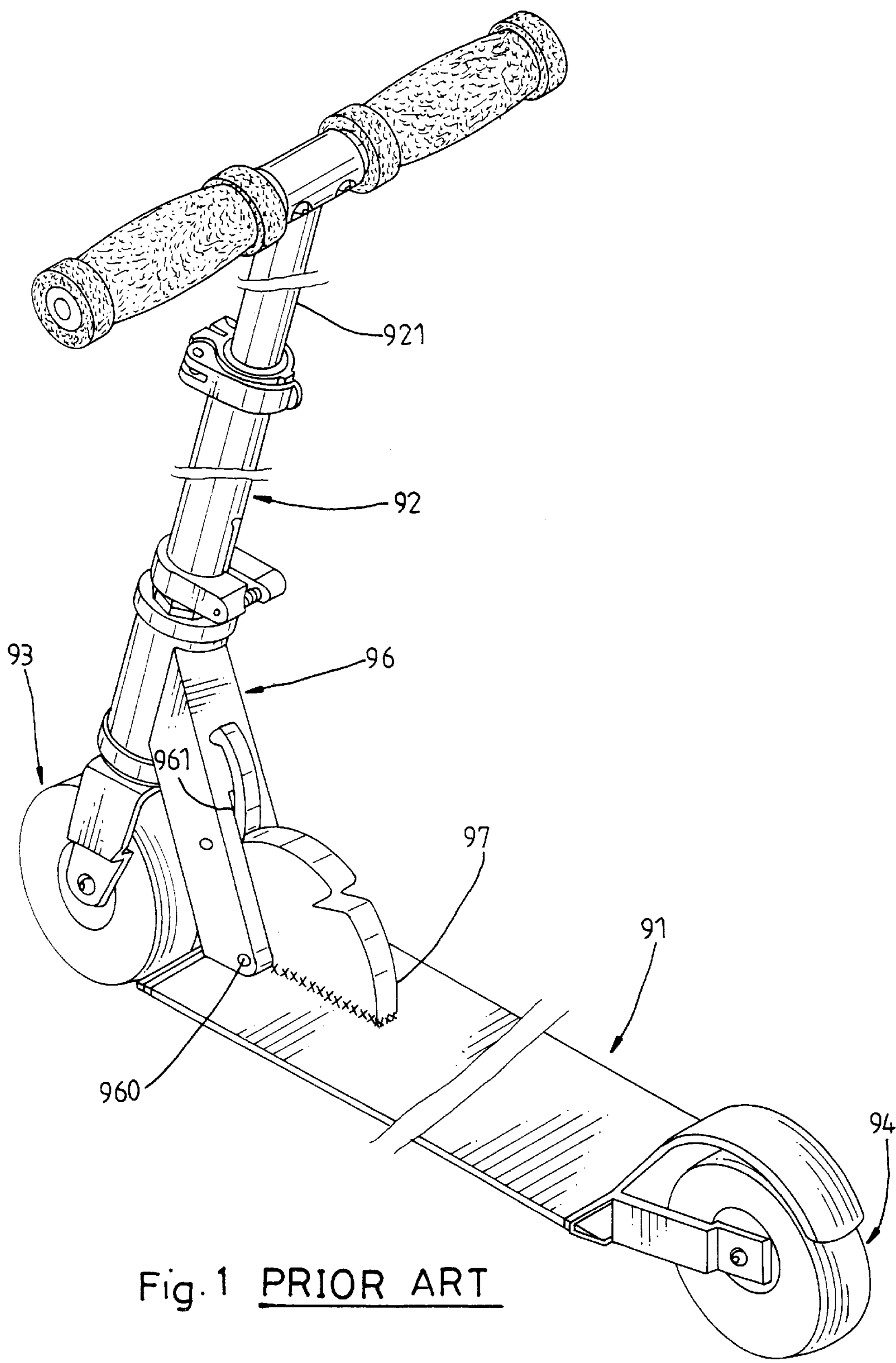
FIG. 1 is an elevational view of a kick scooter according to the prior art.
Figure 2:
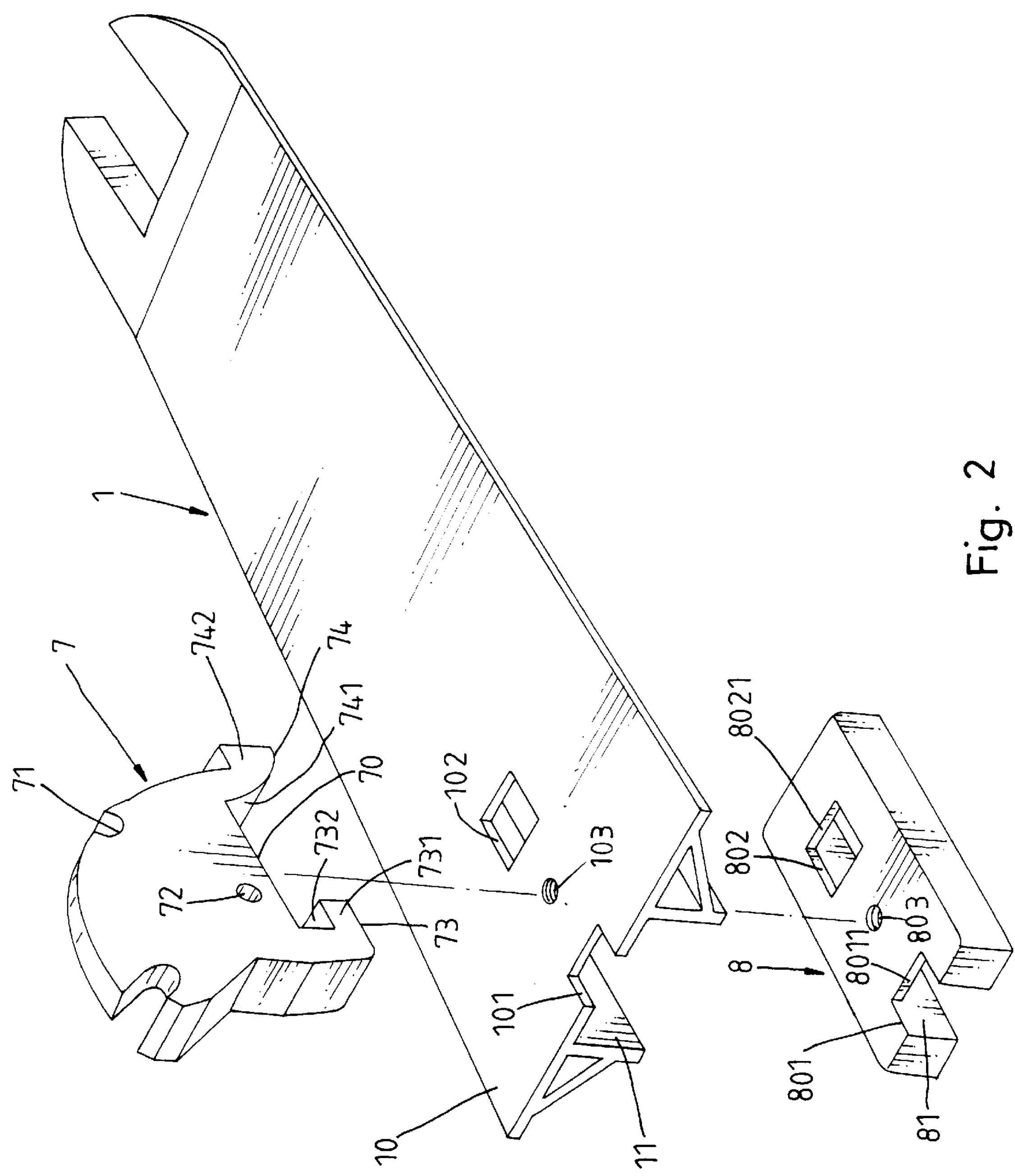
FIG. 2 is an exploded view of the base frame, the coupling block, and the sliding locking block present invention.

Referring to FIGS. 2 from 2 through 7, the present invention comprises a base frame 1 adapted to hold a rear wheel (not shown), a coupling block 7 fastened to the front side of the base frame 1 and adapted to receive a connecting frame of a head frame unit for kick scooter (not shown), enabling the head frame unit to be pivoted to the base frame 1 and turned with the connecting frame between the operative position and the non-operative position, and a sliding locking block 8 installed in the bottom side of the base frame 1 to secure the coupling block 7 to the base frame 1. The coupling block 7 has a transverse pivot hole 72 to which the connecting frame of the head frame unit is pivoted, and two locating notches 71 at the smoothly arched periphery thereof adapted to receive locking means at the connecting frame of the head frame unit alternatively.

The base frame 1 comprises a foot plate 10, a bottom sliding groove 11 disposed at the bottom side of the foot plate 10 and longitudinally extended to the front side thereof on the middle and adapted to receive the sliding locking block 8, a front notch 101 at the front side of the foot plate 10, and an insertion hole 102 through top and bottom side walls of the foot plate 10 in communication with the bottom sliding groove 11. The sliding locking block 8 fits the bottom sliding groove 11, comprising a longitudinally extended bottom groove 81, a front notch 801 corresponding to the front notch 101 of the foot plate 10, and a coupling hole 802 disposed in communication with the bottom groove 81 corresponding to the insertion hole 102 of the foot plate 10. The coupling hole 802 of the sliding locking block 8 is relatively bigger than the insertion hole 102 of the foot plate 10. The coupling block 7 comprises a flat bottom side wall 70, a front bottom hook 73 downwardly extended from the bottom side wall 70 at a front side, and a rear bottom hook 74 downwardly extended from the bottom side wall 70 at a rear a rear side. The front bottom hook 73 has a hooked portion 731 defining with the bottom sidewall 70 an engagement space 732. The rear bottom hook 74 has a smoothly arched hook body 741 terminating in a backwardly extended hooked portion 742.

Figure 3:
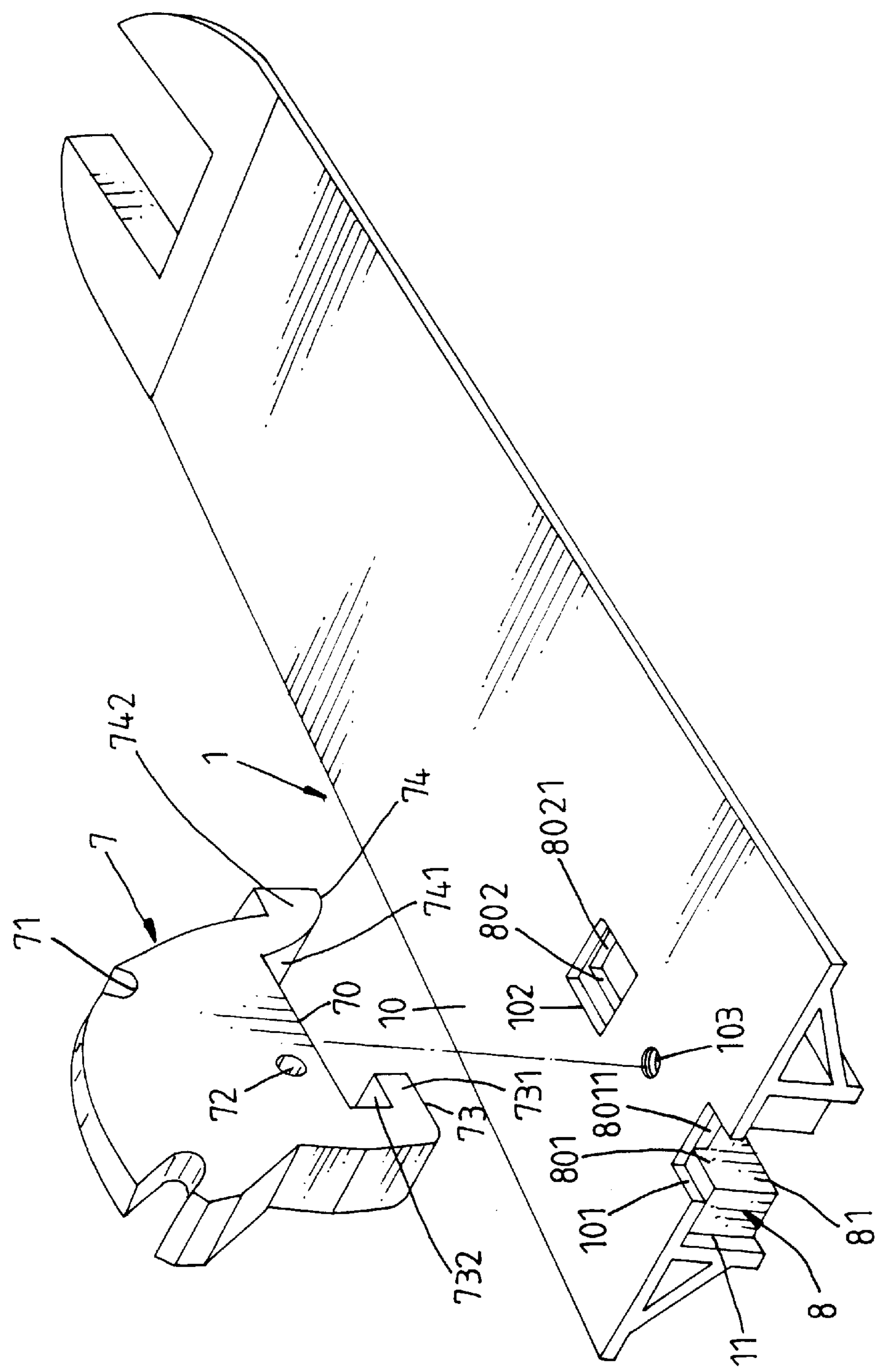
FIG. 3 is another exploded view of the present invention, but showing the sliding locking block installed in the base frame.
Figure 4:
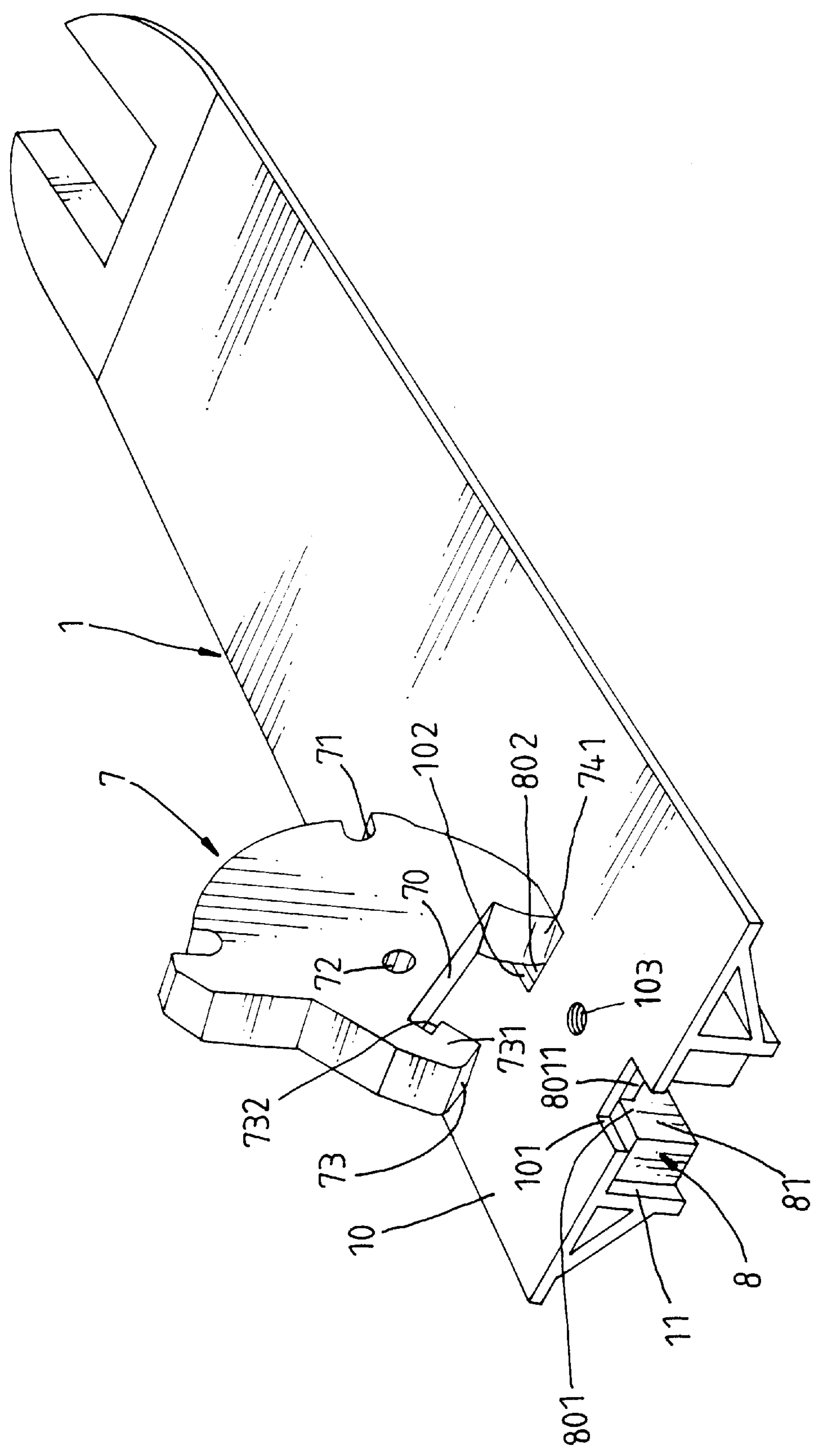
FIG. 4 shows the sliding locking block installed in the base frame, the coupling block obliquely inserted into the insertion hole on the base frame according to the present invention.
Figure 5:
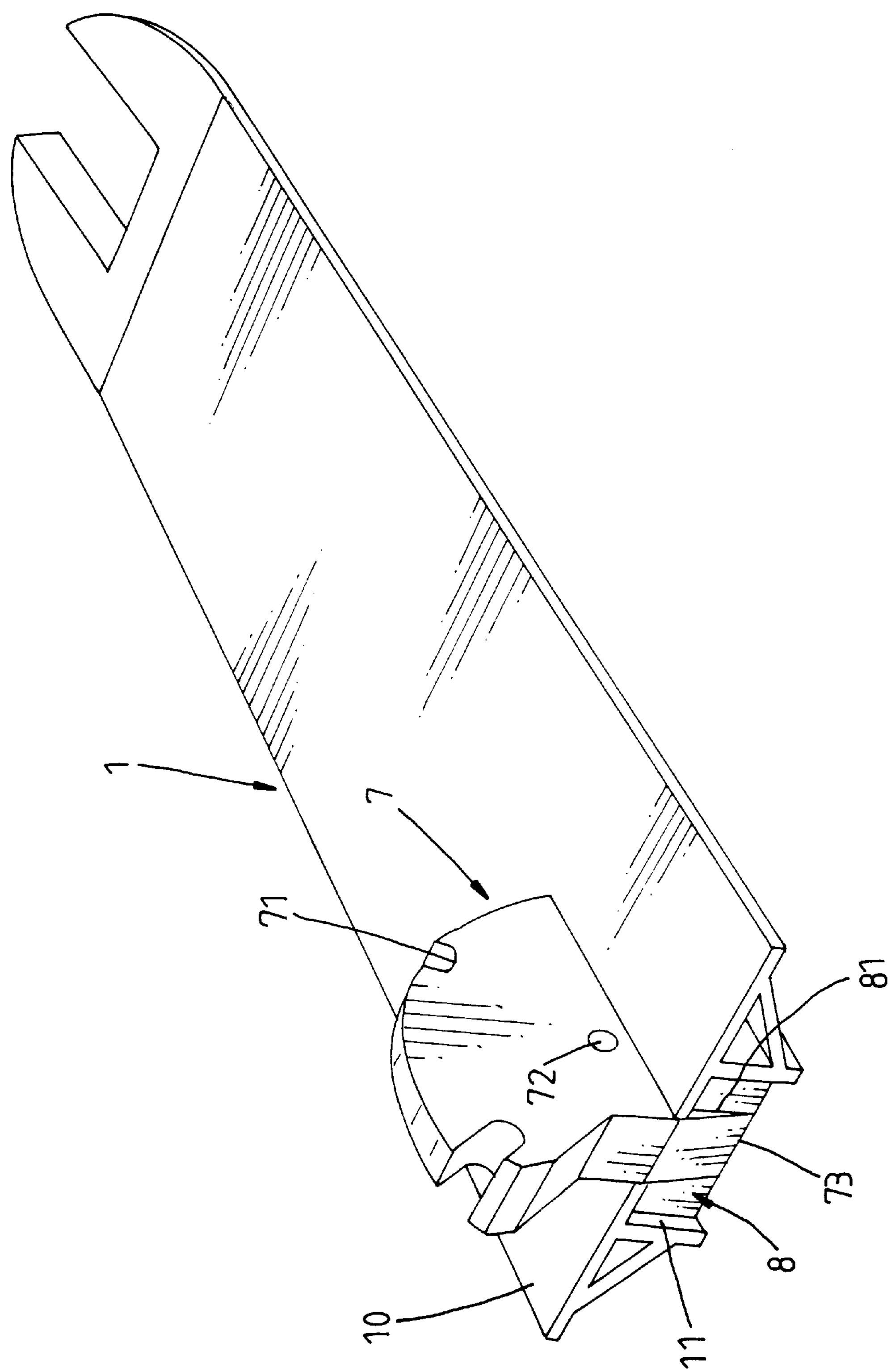
FIG. 5 shows the sliding locking block and the coupling block respectively installed in the base frame and fastened together according to the present invention.
Figure 6:
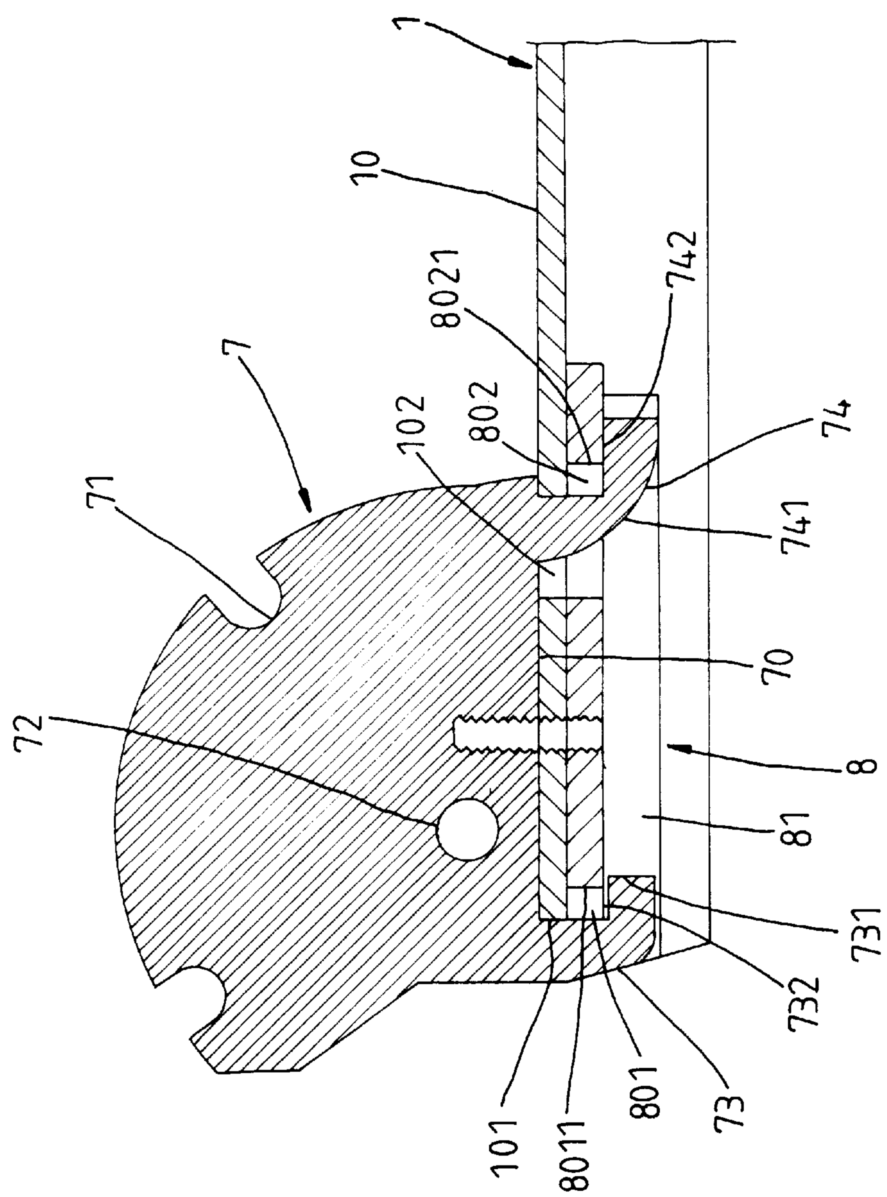
FIG. 6 is a sectional view of FIG. 5.
Figure 7:
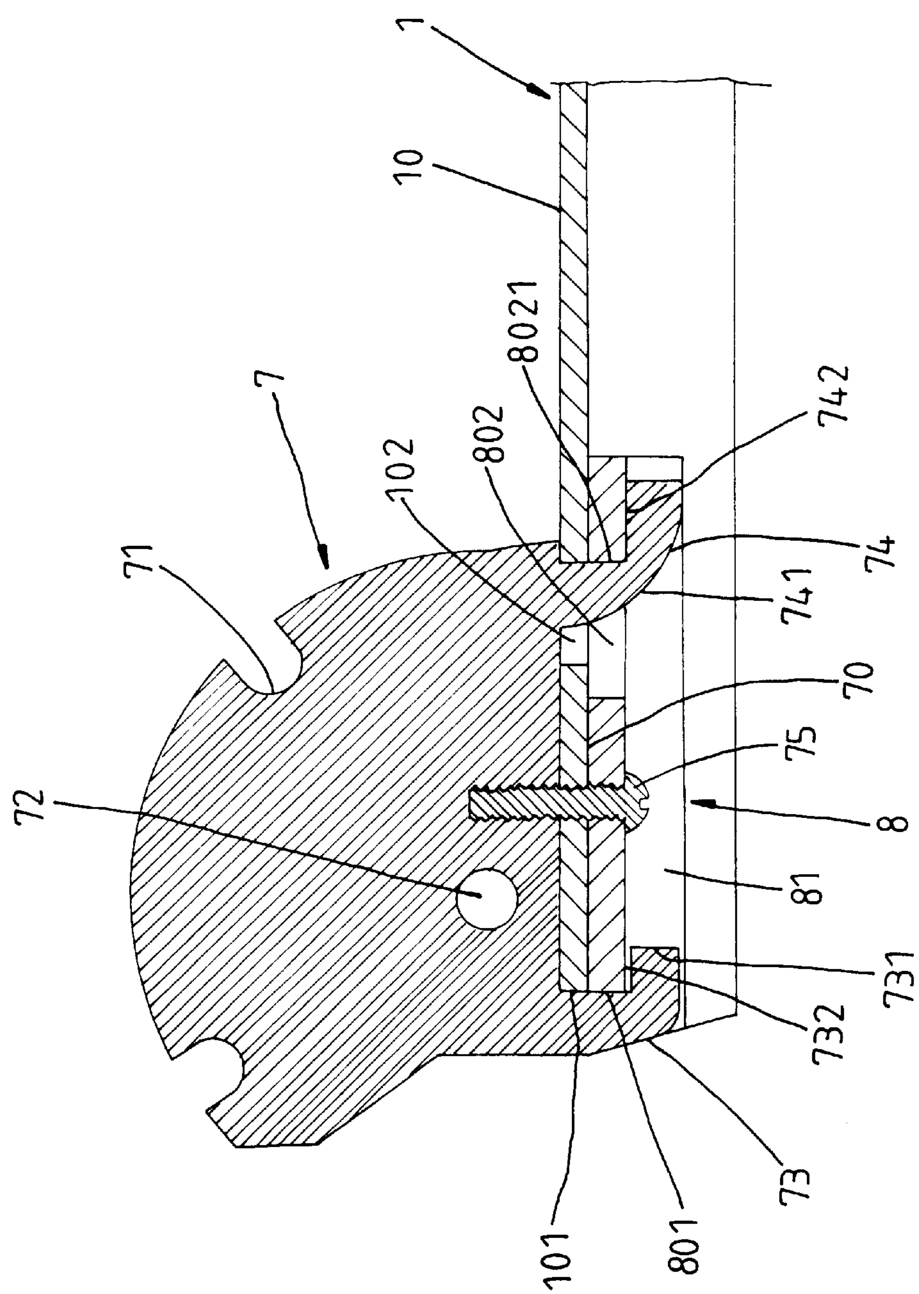
FIG. 7 is similar to FIG. 6 but showing the fastening element fastened to the sliding locking block, the base frame and the coupling block.

The assembly process of the present invention is outlined hereinafter with reference to FIGS. from 3 through 7 again, the sliding locking block 8 is inserted into the bottom sliding groove 11 of the base frame 1 and moved to the position where the front notch 801 and coupling hole 802 of the sliding locking block 8 are disposed in alignment with the front notch 101 and insertion hole 102 of the foot plate 10 (see FIG. 3) respectively. Thereafter, the rear bottom hook 74 of the coupling block 7 is inserted into the insertion hole 102 of the foot plate 10 and the coupling hole 802 of the sliding locking block 8 (see FIG. 4), and then the coupling block 7 is turned forwardly downwards to force the front bottom hook 73 into the front notch 101 of the foot plate 10 and the front notch 801 of the sliding locking block 8 (see FIGS. 5 and 6), and then the sliding locking block 8 is moved forwards in the bottom sliding groove 11 of the base frame 1 to force the back peripheral side 8011 of the front notch 801 of the sliding locking block 8 into the engagement space 732 and the back peripheral side 8021 of the coupling hole 802 of the sliding locking block 8 into engagement with the backwardly extended hooked portion 742 of the rear bottom hook 74 (see FIG. 7), and then a fastening element, for example, a screw 75 is inserted through a through hole 803 on the sliding locking block 8, a through hole 103 on the foot plate 10 and threaded into a screw hole (not shown) on the bottom side wall 70 of the coupling block 7 to fixedly secure the coupling block 7, the base frame 1 and the sliding locking block 8 together (see also FIG. 7). After removal of the screw 75, the coupling block 7 and the sliding locking block 8 can then be detached from the base frame 1.

What is claimed is:

1. A detachable coupling block and base frame mounting arrangement comprising a base frame adapted to hold a rear wheel, a coupling block fastened to a front side of said base frame and adapted to receive a connecting frame of a head frame unit for kick scooter, enabling the head frame unit to be pivoted to said base frame and turned with said connecting frame between an operative position and a non-operative position, and a sliding locking block installed in said base frame at a bottom side to secure the coupling block to said base frame, wherein:

said base frame comprises a foot plate, said foot plate having a front side, a top side, and a bottom side, a bottom sliding groove disposed below the bottom side of said foot plate and longitudinally extended to the front side of said foot plate, an insertion hole extended through the top and bottom sides of said foot plate in communication with said bottom sliding groove, and a through hole extended through the top and bottom sides of said foot plate and spaced between the front notch and insertion hole of said base frame;

said coupling block comprises a flat bottom side wall supported on the top side of said foot plate, a front bottom hook downwardly extended from said bottom side wall at a front side and hooked in the front notch of said foot plate, and a rear bottom hook downwardly extended from said bottom side wall at a rear a rear side and hooked in the insertion hole of said foot plate, said front bottom hook having a hooked portion defining with said bottom sidewall an engagement space, said rear bottom hook having a smoothly arched hook body terminating in a backwardly extended hooked portion;

said sliding locking block is inserted into said bottom sliding groove at the bottom side of said foot plate and longitudinally moved in said bottom sliding groove between a first position where said sliding locking block locks said coupling block, and a second position where said sliding locking block unlocks said coupling block for enabling said coupling block to be disconnected from said foot plate, said sliding locking block comprising a longitudinally extended bottom groove, a front notch disposed at a front side thereof corresponding to the front notch of said foot plate and adapted to receive the front bottom hook of said coupling block, the front notch of said sliding locking block having a rear peripheral side adapted to engage into the engagement space between the bottom side wall and front bottom hook of said coupling block, a coupling hole disposed in communication with the bottom groove of said sliding locking block corresponding to the insertion hole of said foot plate and adapted to receive the hooked portion of the rear bottom hook of said coupling block, and a through hole adapted to receive a fastening element, enabling the fastening element to be inserted through the through hole on the foot plate of said base frame and threaded into the bottom side wall of said coupling block to fixedly secure said sliding locking block, said base frame and said coupling block together.

* * * * *